UNITED STATES PATENT OFFICE

KURT DESAMARI, OF LEVERKUSEN-ON-THE-RHINE, GERMANY, ASSIGNOR TO WINTHROP CHEMICAL COMPANY, INC., OF NEW YORK, N. Y., A CORPORATION OF NEW YORK

ALKYL-QUINOLYL-AMINO-PHENYL CARBOXYLIC ACIDS

No Drawing. Application filed November 30, 1928, Serial No. 322,975, and in Germany December 7, 1927.

The present invention relates to new alkyl-quinolyl-amino-phenyl-carboxylic acids and their esters and to a process of preparing same, more particularly it relates to compounds of the general formula:

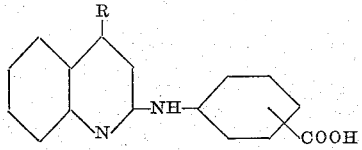

wherein R stands for an alkyl group.

My new compounds are obtainable by reacting a compound of the general formula:

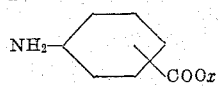

wherein x stands for hydrogen or alkyl upon a 4-alkylquinoline which is substituted in the 2-position by a halogen atom having the general formula:

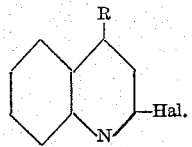

wherein R stands for an alkyl group and Hal for a halogen, in a liquid form, that means by melting together the two components or by allowing them to interact in a solvent or diluent, for example nitrobenzene. From the esters the free acids are easily obtainable by saponifying the same with an acid or alkali.

The new compounds generally are yellowish, well crystallizing substances of a high melting point, easily soluble in organic solvents, such as nitrobenzene, glacial acetic acid, pyridine, but difficultly soluble in alcohol. The esters are saponified by alkalies or acids, the free acids thereby formed being soluble in alkalies and in strong acids.

My new compounds are valuable therapeutical substances and starting materials in the manufacture of dyestuffs.

The invention is illustrated by the following examples, but not restricted thereto:

*Example 1.*—177.5 parts by weight of 2-chloro-4-methyl-quinoline are heated to 150° C. with 165 parts by weight of para-amino benzoic acid ethyl ester in nitro-benzene solution. On cooling the 4-methyl-2-phenylamino-quinoline-4'-carboxylic acid ester separates almost quantitatively from the solution in the form of the hydrochloride in beautiful yellowish crystals.

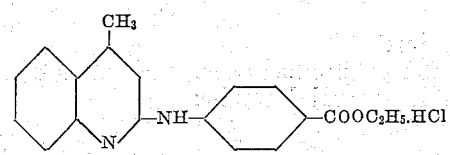

On saponifying the ester with the customary saponifying agents the 4-methyl-2-phenylamino-quinoline-4'-carboxylic acid is obtained therefrom. The latter is a pale yellow colored powder, decomposing at 305 to 307° C. It is a weak acid, forming salts with excess alkali, which are very readily soluble in water. Acids reprecipitate the free carboxylic acid unchanged from the alkaline solutions

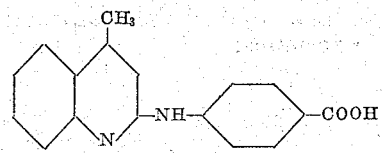

The free acid is also obtainable by fusing together 177.5 parts by weight of 2-chloro-4-methyl-quinoline and 137 parts by weight of p-amino-benzoic acid.

*Example 2.*—177.5 parts by weight of 2-chloro-4-methylquinoline are fused with 137 parts by weight of m-aminobenzoic acid.

The melt is dissolved in aqueous caustic soda. Acids precipitate the 4-methyl-2-phenylamino-quinoline-3'-carboxylic acid from this solution, which is a colorless powder and decomposes on heating at 225 to 265° C.

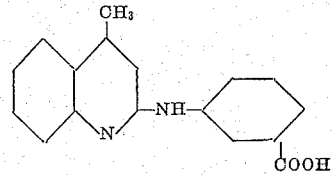

*Example 3.*—165 parts by weight of anthranilic acid ethyl ester are condensed in nitrobenzene solution with 177.5 parts by weight of 2-chloro-4-methylquinoline. The hydrochloride of the 4-methyl-2-phenylamino-quinoline-2'-carboxylic acid ester, which separates from the solution on cooling, can readily be converted by saponifying agents into the 4-methyl-2-phenylamino-quinoline-2'-carboxylic acid. The latter forms a yellowish colored powder, which is extremely readily soluble in aqueous alkalies and melts at 203° C. The substance dissolves in nitrobenzene, glacial acetic acid and pyridine, also with difficulty in alcohol from which it can be recrystallized. It has the following formula:

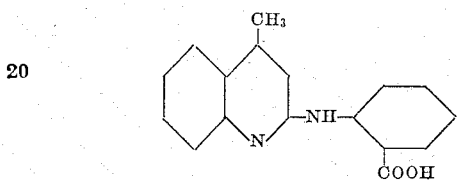

I claim:

1. As new products the compounds of the probable general formula:

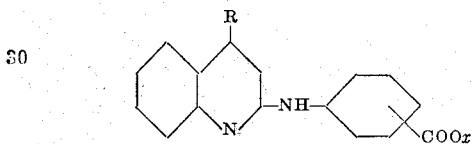

wherein R stands for an alkyl group and $x$ stands for a hydrogen or an alkyl group, being generally substances soluble in organic solvents and being valuable therapeutical substances and starting materials in the manufacture of dyestuffs.

2. As a new product the compound of the probable formula:

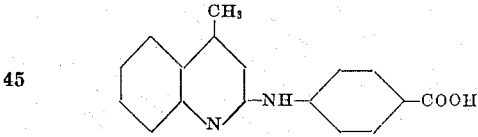

being a pale yellow powder which is soluble in alkalies from which the free acid is reprecipitated by the addition of an acid and being a valuable therapeutical substance and a starting material in the manufacture of dyestuffs.

In testimony whereof I have hereunto set my hand.

KURT DESAMARI. [L. S.]